United States Patent [19]
Fischer et al.

[11] Patent Number: 4,467,762
[45] Date of Patent: Aug. 28, 1984

[54] CONTROL APPARATUS FOR A FUEL METERING SYSTEM

[75] Inventors: Werner Fischer, Ditzingen; Johannes Locher, Stuttgart, both of Fed. Rep. of Germany

[73] Assignee: Robert Bosch GmbH, Stuttgart, Fed. Rep. of Germany

[21] Appl. No.: 405,447

[22] Filed: Aug. 5, 1982

[30] Foreign Application Priority Data

Sep. 2, 1981 [DE] Fed. Rep. of Germany ....... 3134632

[51] Int. Cl.³ .............................................. F02M 39/00
[52] U.S. Cl. .................................. 123/357; 123/359; 123/179 G; 123/198 D
[58] Field of Search ............... 123/357, 358, 359, 479, 123/491, 198 D, 179 G, 179 L, 623

[56] References Cited

U.S. PATENT DOCUMENTS

| 3,504,657 | 4/1970 | Eichler et al. | 123/491 |
| 3,616,784 | 11/1971 | Barr | 123/179 G |
| 3,731,664 | 5/1973 | Tsuzuki et al. | 123/357 |
| 3,973,537 | 8/1976 | Williams et al. | 123/357 |
| 4,279,229 | 7/1981 | Arnold et al. | 123/357 |

*Primary Examiner*—Magdalen Y. C. Moy
*Attorney, Agent, or Firm*—Edwin E. Greigg

[57] ABSTRACT

A control apparatus for a fuel metering system including a fuel pump is proposed, where in the case of a Diesel engine with insufficient voltage during starting, the final control element for the governor rod of the fuel pump is uncoupled from the signal processing unit and connected directly to a supply voltage line. It is thereby possible to prevent indefinite output signals of the signal processing unit, which appear in case of insufficient voltage, from having any effect, and simultaneously it is possible to attain reliable starting of the engine.

3 Claims, 2 Drawing Figures

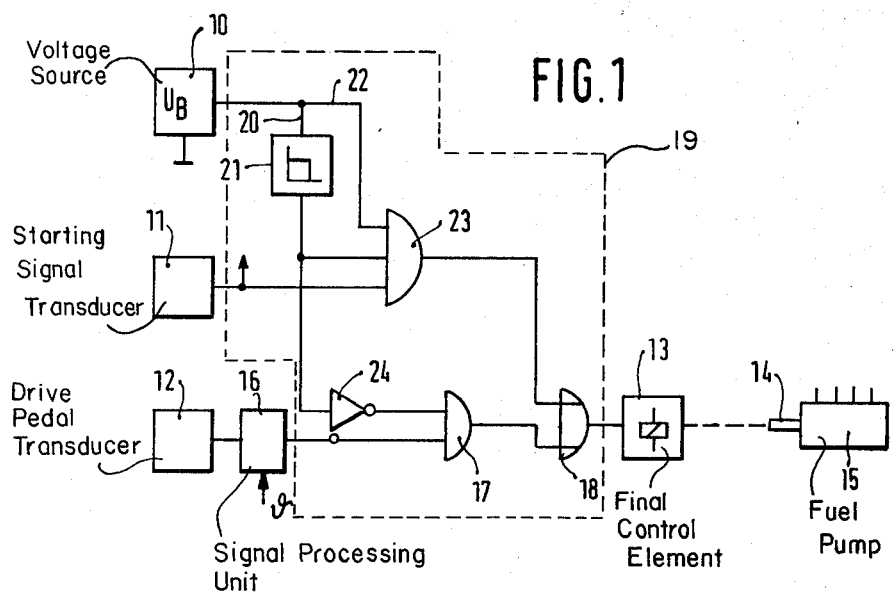
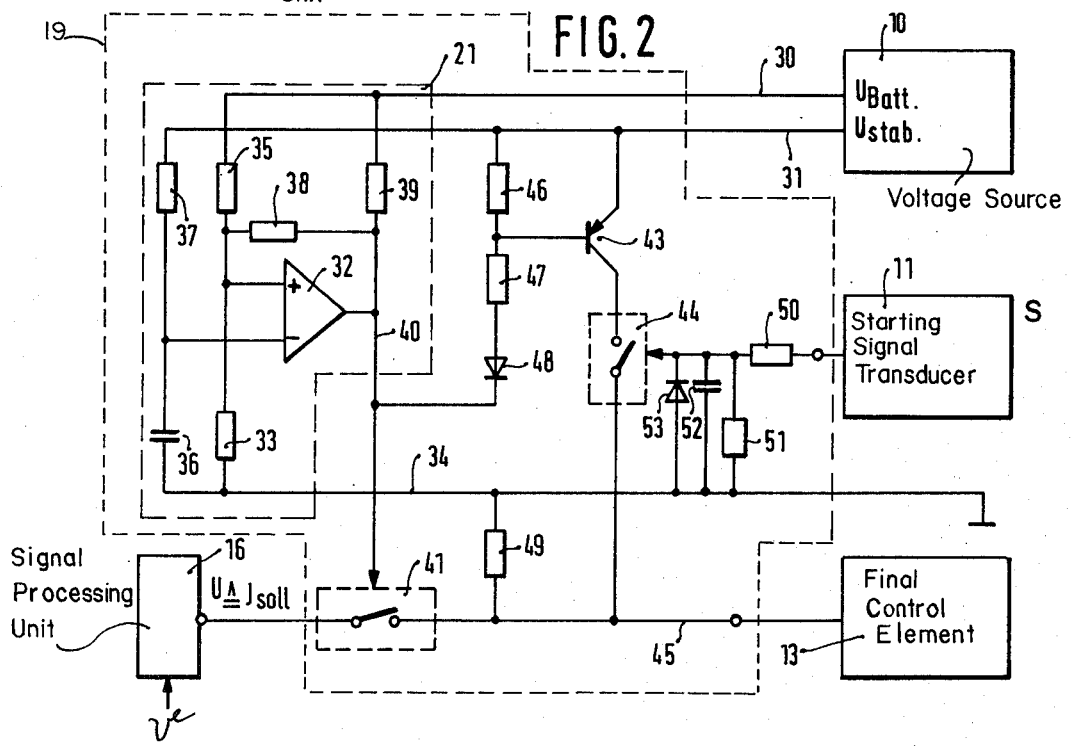

CONTROL APPARATUS FOR A FUEL METERING SYSTEM

BACKGROUND OF THE INVENTION

The present invention relates to a control apparatus for a fuel metering system of an internal combustion engine, and in particular for controlling the position of a fuel quantity-determining member of a diesel engine fuel pump. The apparatus includes a drive pedal transducer, a subsequent signal processing unit and a starting signal transducer.

In connection with a diesel engine, a control apparatus for the position of a member of a fuel pump determining the fuel injection quantity is known. This control apparatus includes, as noted above, a drive pedal sensor, a signal processing unit, and a starting signal transducer. During the engine starting procedure, a predetermined temperature-dependent starting fuel quantity is pre-specified in the case of the known control apparatus, this fuel quantity being brought about by a corresponding triggering of a final control element for the fuel quantity-determining member. The important feature is that the position of the fuel quantity-determining member of the fuel pump is defined during starting solely by the output signal of the control unit. While in theoretical terms the known system functions in a satisfactory manner, problems have arisen in practical operation. This is because of the fact that during the starting process, particuarly with a battery which is already weak, the supply voltage for the control unit can drop to such an extent that the control unit no longer emits precisely defined output signals. In this case, then, it is a necessary consequence that the required starting fuel quantity is not attained either.

OBJECT AND SUMMARY OF THE INVENTION

It is an object of the present invention to provide a control apparatus for a fuel metering system in which a reliable starting fuel quantity is available.

According to the present invention the final control element of the fuel quantity-determining member of the fuel pump is subjected to supply voltage whenever a starting signal is present and the supply voltage drops below a predetermined level.

With the control apparatus according to the present invention, starting enrichment of the fuel quantity is possible even with an extremely weak battery, thus assuring reliable starting of the internal combustion engine.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows a block circuit diagram of the control apparatus according to the invention; and FIG. 2 is a more detailed circuit diagram.

DESCRIPTION OF THE PREFERRED EMBODIMENTS

The exemplary embodiments relate to a control apparatus for the position of a fuel quantity-determining member of a fuel pump in a diesel engine.

In FIG. 1, an operating voltage source is indicated by reference numeral 10, a starting signal transducer by 11, and a drive pedal transducer by 12. Reference 13 indicates a final control element for a governor rod 14 of a fuel pump 15, which in turn supplies the combustion chambers of a diesel engine, not shown, with fuel. A control circuit 19 is provided as shown.

The drive pedal transducer 12 emits its output signal to a signal processing unit 16. An AND gate 17 follows, and then an OR gate 18, which on its output side triggers the final control element 13. A first line 20 leads from the source of operating voltage 10 to a threshold switch 21, which emits a positive signal whenever the operating voltage falls below a predetermined value. A line 22 also leads from the operating voltage source 10 to an AND gate 23, both of the further inputs of which are coupled with the output of the threshold switch 21 and the starting signal transducer 11. On the output side, the AND gate 23 is also connected with the second input of the OR gate 18. The output of the threshold switch 21 is also connected via an inverter 24 with the AND gate 17.

Given a supply voltage which is within normal operating limits, the output potential of the threshold switch 21 is at zero, and as a result, and because of the inverter 24, the output signal of the signal processing unit 16, which is dependent upon the drive pedal, is delivered via the AND gate 17 and the OR gate 18 to the final control element 13 for the governor rod 14 of the fuel pump 15. Now if the supply voltage drops during normal driving operation, then the threshold switch 21 switches over and the AND gate 17 blocks the signals arriving from the drive pedal sensor 12 through the signal processing unit 16. As a result, the final control element 13 assumes its zero position and directs the fuel pump 15 to effect zero or minimum supply. This is desirable because in normal driving operation an extreme drop in the supply voltage is extremely unusual and it must be assured, for instance in cases of an accident, that the fuel supply is terminated.

The situation is different, however, when there are severe voltage interruptions during starting due, for instance, to a battery which has already aged. In this situation no danger to the engine, the vehicle, or even persons can be expected in such a case. For this reason, interrupting the fuel supply is not useful in that case. The logic system shown in FIG. 1 having the AND gate 23 and the OR gate 18 assures that if there is excessively low voltage during starting the final control element 13 will be exposed directly to supply voltage. Accordingly, the final control element 13 in this type of operation assumes its maximal possible position, so that reliable starting is probable even with a very low supply voltage.

FIG. 2 illustrates another exemplary embodiment of the circuit layout illustrated in FIG. 1, with identical components and component groups being identified by the same reference numerals. Specific changes in comparison with the logic circuit diagram of FIG. 1 are provided because in the subject of FIG. 1 great value was placed on simplification. FIG. 2 shows two output lines for the supply voltage source 10, that is, one direct battery voltage line 30 and one supply voltage line 31, on which a stabilized voltage is furnished. The threshold switch 21 comprises an operational amplifier 32, whose positive input is coupled via a resistor 33 with a ground line 34 and via a resistor 35 with the battery voltage line 30. From the negative input of this amplifier 32, a capacitor 36 leads to the ground line 34 and a resistor 37 leads to the supply line 31. Positive feedback for the amplifier 32 is provided by means of a resistor 38. From the output of the amplifier 32, a resistor 39 leads to the battery voltage line 30 and a line 40 also leads to the control input of a switch 41. This switch 41 is located between the signal processing unit 16 and the final control element 13. A transistor 43 is located in series with a controllable switch 44, and this series circuit in turn connects the supply line 31 with a connecting line 45 between the switch 41 and the final control element 13. The transistor 43 is triggered via a voltage divider comprising two resistors 46 and 47, which also has a diode 48 switched in series with it, between the output line 40 of the operational amplifier 32 and the supply line 31. A resistor 49 also leads from the connecting line 45 to the ground line 34. The switch 44 is triggered by the starting signal transducer 11 via a resistor 50, and subsequently a parallel circuit comprising the resistor 51, capacitor 52 and diode 53 leading to the ground line 34.

If the battery voltage on the line 30 is within the normal voltage range, then the output potential of the operational amplifier 32 is at high potential and the switch 41 is switched through. If the battery voltage drops below a predetermined value fixed by the circuitry of the operational amplifier 32, then the operational amplifier switches its output potential to zero and the switch 41 opens. In this case, the resistor 49 brings the voltage on the connecting line 45 to the value of the ground line 34, which corresponds to a zero position of the final control element and thus of the governor rod of the injection pump.

If the battery voltage is sufficient and there is accordingly a high potential at the output of the operational amplifier 32, the transistor 43 blocks. In contrast, with a low battery voltage, the transistor 43 is conductive and if the switch 44 is closed during the starting procedure, then the potential of the supply line 31 reaches the connecting line 45 and thus the final control element 13 by way of the transistor 43 and the switch 44. Since the switch 41 is at the same time interrupted in this event, the maximum possible supply voltage is exerted on the final control element 13, which in turn causes reliable starting of the engine.

With the low-pass layout including components 50–53 in the line from the starting signal transducer 11, interference which may have entered the system can be filtered out. The diode 53 protects the switch 44 from negative voltage peaks on the one hand, and on the other hand, if the battery voltage is of an incorrect polarity, it protects the switch from a negative voltage over the line from the starting signal transducer 11.

What is important in both exemplary embodiments is that if the battery voltage is low and at the same time the starter for the engine is actuated, an uncoupling of the control unit and the final control element is expected, and at the same time the final control element for the governor rod of the injection pump can be subjected to maximum current.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In a control apparatus of a fuel metering system including a fuel pump having a fuel quantity-determining member, the apparatus including: a source of supply voltage; a drive pedal transducer; a signal processing unit connected to the drive pedal transducer; a starting signal transducer; and a final control element of the fuel quantity-determining member, said final control element having a zero position, the improvement comprising:

control circuit means including means for supply voltage control, said control circuit means being connected to the source of supply voltage, the signal processing unit, the starting signal transducer and the final control element, wherein:
(i) said control circuit means in response to the output of said supply voltage control means brings said final control element into its zero position when the supply voltage is below a predetermined value; and
(ii) said control circuit means subjects said final control element to the supply voltage when a starting signal is generated by said starting signal transducer.

2. In the control apparatus as defined in claim 1, wherein the control circuit means includes: an inverter; an AND gate connected to the inverter and to the signal processing unit; an OR gate connected by one of its inputs to the AND gate and to the starting signal transducer; and switching value means connected to the source of supply voltage and to the inverter, and further wherein:
(iii) the AND gate and the OR gate are disposed between the signal processing unit and
(iv) the AND gate is subjected to a signal from the signal processing unit and produces an output only when the supply voltage exceeds a predetermined value; and
(v) the OR gate is subjected, at its other input, to logically linked signals from the starting signal transducer and the switching value means.

3. In the control apparatus as defined in claim 2, wherein the switching value means includes a threshold switch and an operational amplifier having positive feedback.

* * * * *